(12) United States Patent
Tiew et al.

(10) Patent No.: US 12,741,233 B2
(45) Date of Patent: Sep. 22, 2026

(54) VE ENRICHMENT SYSTEM

(71) Applicant: JJ-Lurgi Engineering Equipment (Shanghai) Co. Ltd, Shanghai (CN)

(72) Inventors: Kin Gee Tiew, Shanghai (CN); Gangben Zeng, Shanghai (CN); Jifu Zheng, Shanghai (CN); Zhiyong Tang, Shanghai (CN); Yang Chen, Shanghai (CN); Qianwen Li, Shanghai (CN)

(73) Assignee: JJ-LURGI ENGINEERING EQUIPMENT (SHANGHAI) CO. LTD, Shanghai (CN)

( * ) Notice: Subject to any disclaimer, the term of this patent is extended or adjusted under 35 U.S.C. 154(b) by 244 days.

(21) Appl. No.: 18/593,627

(22) Filed: Mar. 1, 2024

(65) Prior Publication Data

US 2024/0293761 A1 Sep. 5, 2024

(30) Foreign Application Priority Data

Mar. 2, 2023 (CN) ......................... 202320366606.1

(51) Int. Cl.
*B01D 3/38* (2006.01)
*B01D 3/00* (2006.01)
(Continued)

(52) U.S. Cl.
CPC ............... *B01D 3/38* (2013.01); *B01D 3/007* (2013.01); *B01D 3/105* (2013.01); *B01D 3/42* (2013.01); *C11B 3/12* (2013.01)

(58) Field of Classification Search
CPC .......... B01D 3/007; B01D 3/105; B01D 3/38; B01D 3/42; C11B 3/12
See application file for complete search history.

(56) References Cited

U.S. PATENT DOCUMENTS 4,072,482 A * 2/1978 Aoki .................. B01D 19/0015 96/199
4,804,555 A * 2/1989 Marschner ........... A23C 15/145 426/492
(Continued)

FOREIGN PATENT DOCUMENTS

CN 211972260 U * 11/2020

OTHER PUBLICATIONS

Espacenet Machine Translation of CN 211972260 Obtained Dec. 4, 2025. (Year: 2025).*

*Primary Examiner* — Jonathan Miller
(74) *Attorney, Agent, or Firm* — Maschoff Brennan

(57) ABSTRACT

Disclosed is a VE Enrichment System, comprising a falling film heat exchanger, a deodorization tower (deodorizer), a deodorizer transfer pump, a post-stripping deodorization tower (post-stripper), a high pressure steam heater and fatty acid collection unit. The falling film heat exchanger comprises of 2 shell heat exchange section of which the bottom section is connected to the deodorizer and the upper section is connected to the high pressure steam heater which is then connected to the post stripper; the post stripper bottom outlet is connected back to the falling film heat exchanger at it tube side. The post stripper top outlet (vapour outlet) is connected to the fatty acid collection unit. The upper shell section of the falling film heat exchanger and the high pressure steam heater forms a loop with the post stripper, while another loop is formed for the bottom of shell section of the falling film heat exchanger and the deodorizer and its transfer pump. Depending on operation needs, a vacuum ejector can be added. This VE enrichment system is used to produce more fatty acid distillate with higher VE content during the deodorization process of vegetable oil.

9 Claims, 3 Drawing Sheets

(51) Int. Cl.

| | |
|---|---|
| ***B01D 3/10*** | (2006.01) |
| ***B01D 3/42*** | (2006.01) |
| ***C11B 3/12*** | (2006.01) |

(56) References Cited

U.S. PATENT DOCUMENTS

| | | | | |
|---|---|---|---|---|
| 4,996,072 | A * | 2/1991 | Marschner | A23D 9/00<br>426/492 |
| 5,436,018 | A * | 7/1995 | Massie | A23C 15/145<br>554/15 |
| 6,953,499 | B2 * | 10/2005 | Kellens | C11B 3/12<br>96/197 |
| 7,670,634 | B2 * | 3/2010 | Kellens | B01D 3/346<br>426/492 |
| 11,603,505 | B2 * | 3/2023 | Kellens | C11B 3/10 |
| 2004/0253353 | A1 * | 12/2004 | Copeland | C11B 3/00<br>426/417 |
| 2013/0287925 | A1 * | 10/2013 | Schols | A23D 9/04<br>426/601 |
| 2020/0297008 | A1 * | 9/2020 | Kellens | A23L 5/23 |

* cited by examiner

VE ENRICHMENT SYSTEM

TECHNICAL FIELD

The invention relates to the edible oil processing field, specifically, relates to a VE enrichment system.

BACKGROUND TECHNOLOGY

VE, that is, vitamin E, also known as tocopherol or pregnantrol. As one of the important antioxidants in nature, VE is widely used in clinical, pharmaceutical, food, feed, health products and cosmetics industries. Compared with artificial VE, natural VE has the advantages of high safety, good absorption efficiency by the human body, and higher nutritional value, and meets the requirements of domestic residents for healthy food. Therefore, the market demand for natural VE continues to expand and prices continue to rise.

VE is commonly found in various vegetable oils, such as soybeans, rapeseeds, corn, sunflower seeds, etc. In the process of edible oil processing, neutralization process, bleaching process and deodorization process are usually used to achieve the purpose of refining vegetable oil. Among them, deodorization process is to use the difference in the volatility of odorous substances and triglycerides in the oil to remove aldehydes, ketones, free fatty acids, unsaturated hydrocarbons and other odorous substances by steam distillation under high temperature and high vacuum conditions. It is used to remove free fatty acids and unpleasant gaseous substances in vegetable oil. The effluent fatty acid distillate is one of the by-products of vegetable oil in the refining and deodorization process, is composed of free fatty acids, glycerides, VE, sterols and other substances. The price of fatty acid distillates, which are the main source of natural VE, also varies greatly depending on the VE content. According to the current market price, for every 1% increase in the VE content in fatty acid distillates, the price of fatty acid distillate will increase by thousands of yuan per ton.

The traditional vegetable oil deodorization process is shown in FIG. 1, the bleached oil after bleaching enters the falling film heat exchanger (1') and is heat exchanged with the outgoing high-temperature deodorized oil to 220~225° C. It then enters the high-pressure steam heater (2') for further heating. After entering the deodorization tower (3'), free fatty acids and unpleasant gaseous substances are removed under the conditions of vacuum absolute pressure of 2.0~4.0 mbar and 240~245° C. The free fatty acid gases are condensed in the fatty acid collection unit (5'), and is collected as fatty acid distillate (VE content 4%~6%), a by-product. When the fatty acid collection unit (5') reaches a high level, the fatty acid distillate (VE content 4%~6%) will be discharged to the outdoor fatty acid distillate storage tank through the circulating pump (6'); when the fatty acid collection unit (5') reaches a low level, the outflow is stopped. The high-temperature deodorized oil treated by the deodorization tower (3') is sent back to the falling film heat exchanger (1') through the deodorizer transfer pump (4') to exchange heat with the bleached oil. The bleached oil goes to the shell of the falling film heat exchanger (1'), and the high-temperature deodorized oil goes to the tube side of the falling film heat exchanger (1'). After the high-temperature deodorized oil has been heated exchanged with the bleached oil, the temperature is reduced and stored as a refined oil. At the same time, the bleached oil at a higher temperature enters the high-pressure heater (2') for subsequent deodorization. FIG. 1 depicts 1', falling film heat exchanger, 2', high-pressure steam heater, 3', deodorization tower, 4', deodorizer transfer pump; 5', fatty acid collection unit; 6', circulating pump.

Using the traditional vegetable oil deodorization process, only about 0.2% of the fatty acid distillate can be obtained, VE content in the fatty acid distillate is between 4%~6%, the economic benefits of by-products are average, and removal of fatty acids from refined oil is not complete.

SUMMARY

Therefore, technical problem to be solved by the disclosure is; to provide a kind of low cost, VE enrichment system with simple structure, it can improve the economic efficiency of the by-product fatty acid distillate.

The invention involves a technical solution; a VE enrichment system, comprises a falling film heat exchanger which is connected with the deodorization tower, the aforementioned falling film heat exchanger is connected with a high-pressure steam heater, the high-pressure steam heater is connected with post-stripping deodorization tower. The bottom of post-stripping deodorization tower is connected with aforementioned falling film heat exchanger. The top of the post-stripping deodorization tower is connected with the fatty acid collection unit.

A VE enrichment system, characterized as, the top of the post-stripping deodorization tower is connected with the suction port of the vacuum ejector, and the vacuum ejector is connected with the fatty acid collection unit. A vacuum ejector is added between the post-stripping deodorization tower and the fatty acid collection unit. The vacuum pump utilises motive steam to achieve a high vacuum. The vacuum ejector is optional and the addition of the vacuum pump depends on the vacuum degree of the VE enrichment system; when the vacuum degree of the VE enrichment system is poor (reference value: vacuum absolute pressure greater than 1.5 mbarA), the vacuum ejector needs to be installed. When the vacuum degree of the VE enrichment system configuration is good (reference value: vacuum absolute pressure is less than or equal to 1.5 mbarA), the vacuum pump does not need to be installed.

Further, the exhaust port of the vacuum ejector is connected with the fatty acid collection unit.

A VE enrichment system, wherein one side of the shell side of the falling film heat exchanger is connected with the high-pressure steam heater through a pipeline, and forms a loop connection with the post-stripping deodorization tower.

A VE enrichment system, wherein, one side of falling film heat exchanger is connected with deodorization tower by pipeline, and the deodorization tower bottom is connected to deodorizer transfer pump by pipeline, and the deodorizer transfer pump is connected to the shell side of aforementioned falling film heat exchanger upper shell side by pipeline, forming a loop connection.

A VE enrichment system, wherein, the fatty acid collection unit is connected with a circulating pump, a loop connection is formed with the circulating pump through a pipeline.

A VE enrichment system, wherein, the falling film heat exchanger is segmented into 2 shell, an upper and lower shell side section, and is equipped with a temperature control device. The heat exchange temperature of the falling film heat exchanger can be controlled in sections.

A VE enrichment system, wherein, the falling film heat exchanger is a vertical falling film heat exchanger. Compared with traditional horizontal tube heat exchangers, footprint is smaller, heat exchange time is shorter, trans fatty acids content in the refined oil are easier to control.

A VE enrichment system, wherein, an external vacuum system is connected to the top of the fatty acid collection unit.

The invention provides a VE enrichment system, suitable for edible oil refining process, obtain by-product of higher yield and higher value.

Beneficial Effects

The addition of the vegetable oil deodorization process with the VE enrichment system can increase the yield of fatty acid distillate, one of the by-products. At the same time, it can also significantly increase the VE content in fatty acid distillates. Among them, the yield of fatty acid distillate can reach more than 0.3%, and the VE content in fatty acid distillate is as high as 9%~14%.

Compared to the traditional vegetable oil deodorization process, the new VE enrichment system not only achieves higher benefits, but also involves less new equipment and lower operating and investment costs, thus creating higher economic benefits.

DETAILED DESCRIPTION

Figure 1:
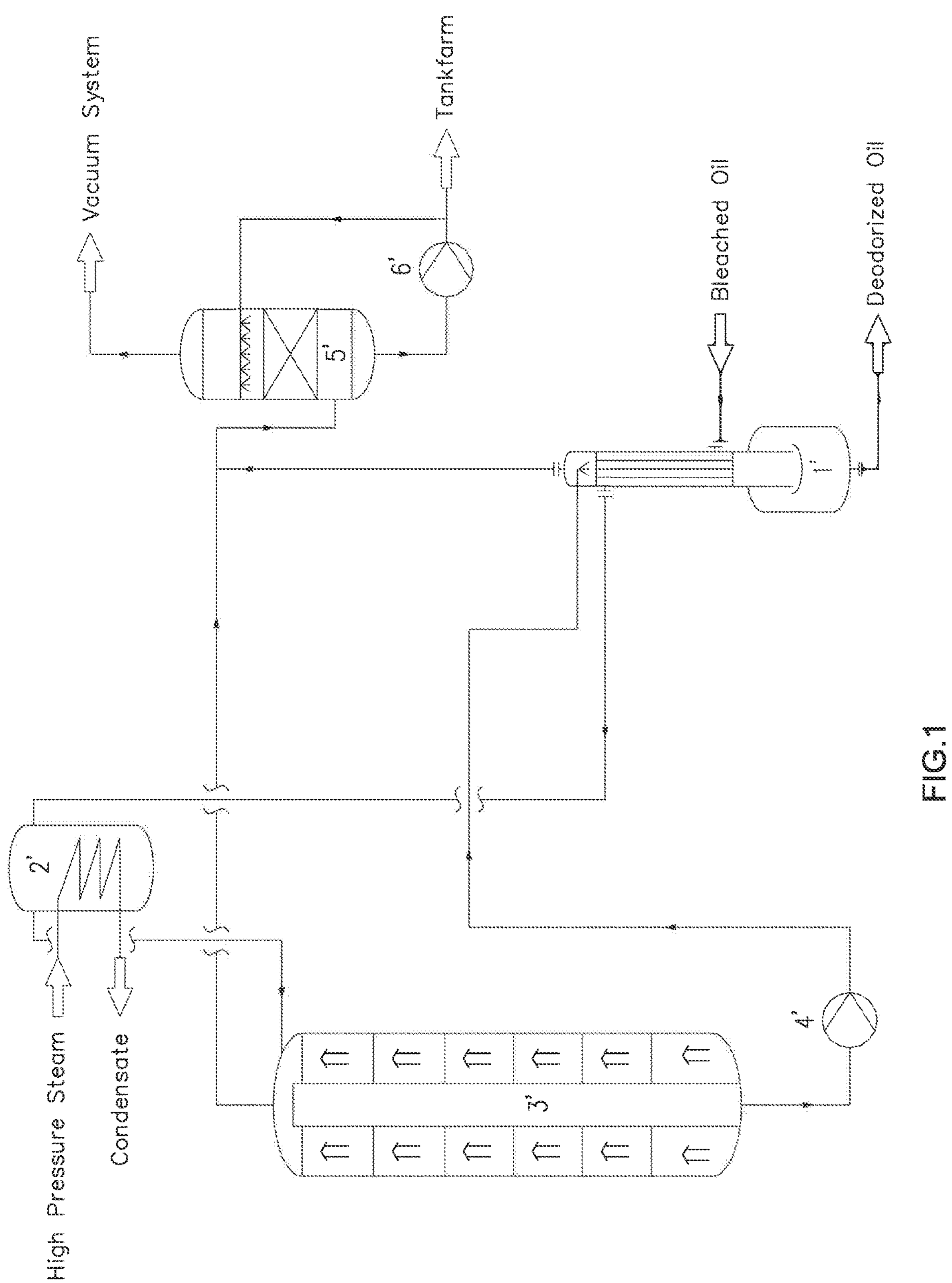
FIG. 1 is a schematic diagram of the deodorization process of traditional vegetable oil.
Figure 2:
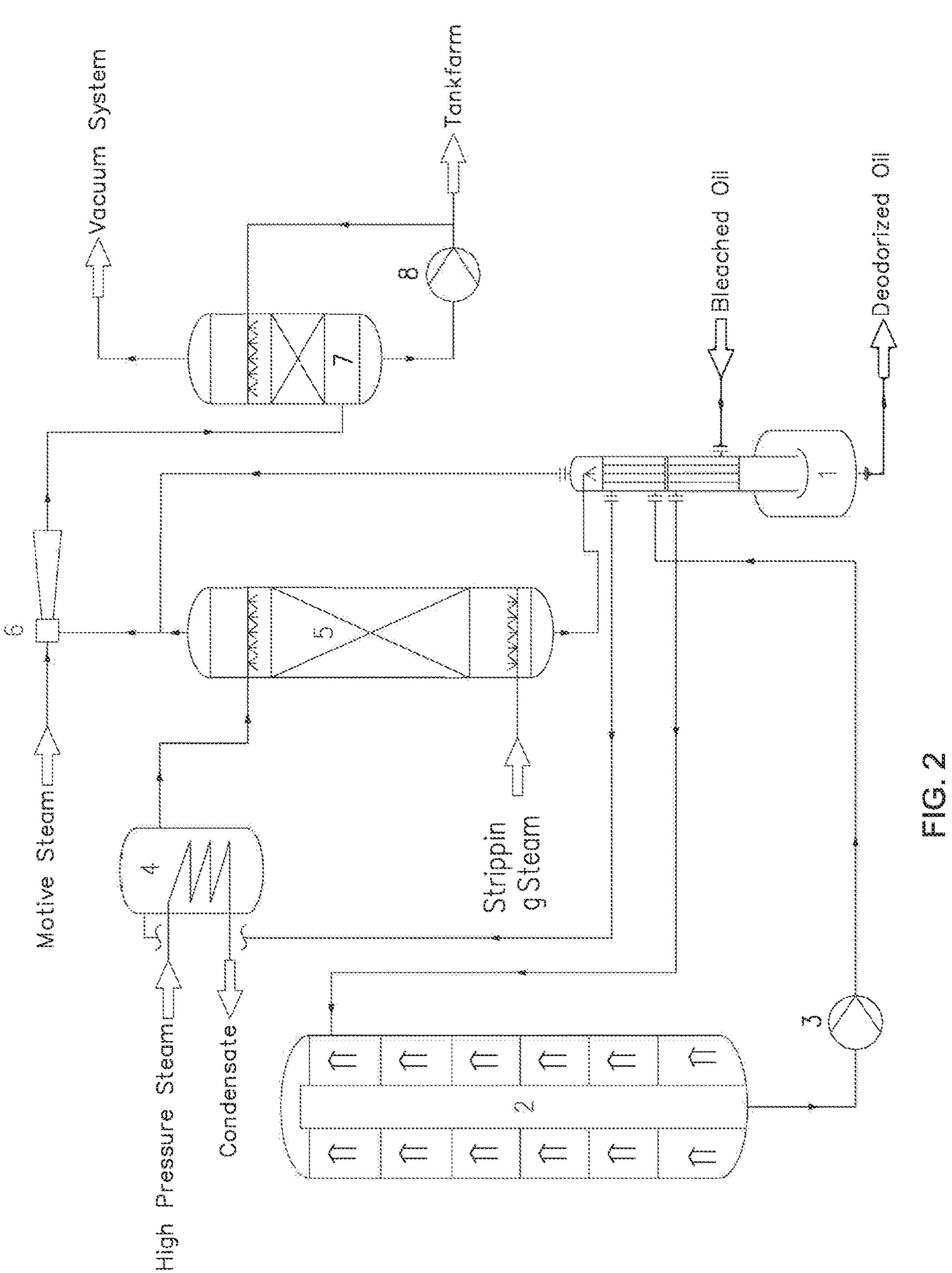
FIG. 2 is a schematic diagram of the new vegetable oil deodorization process with VE enrichment system (including vacuum pump design)
Figure 3:
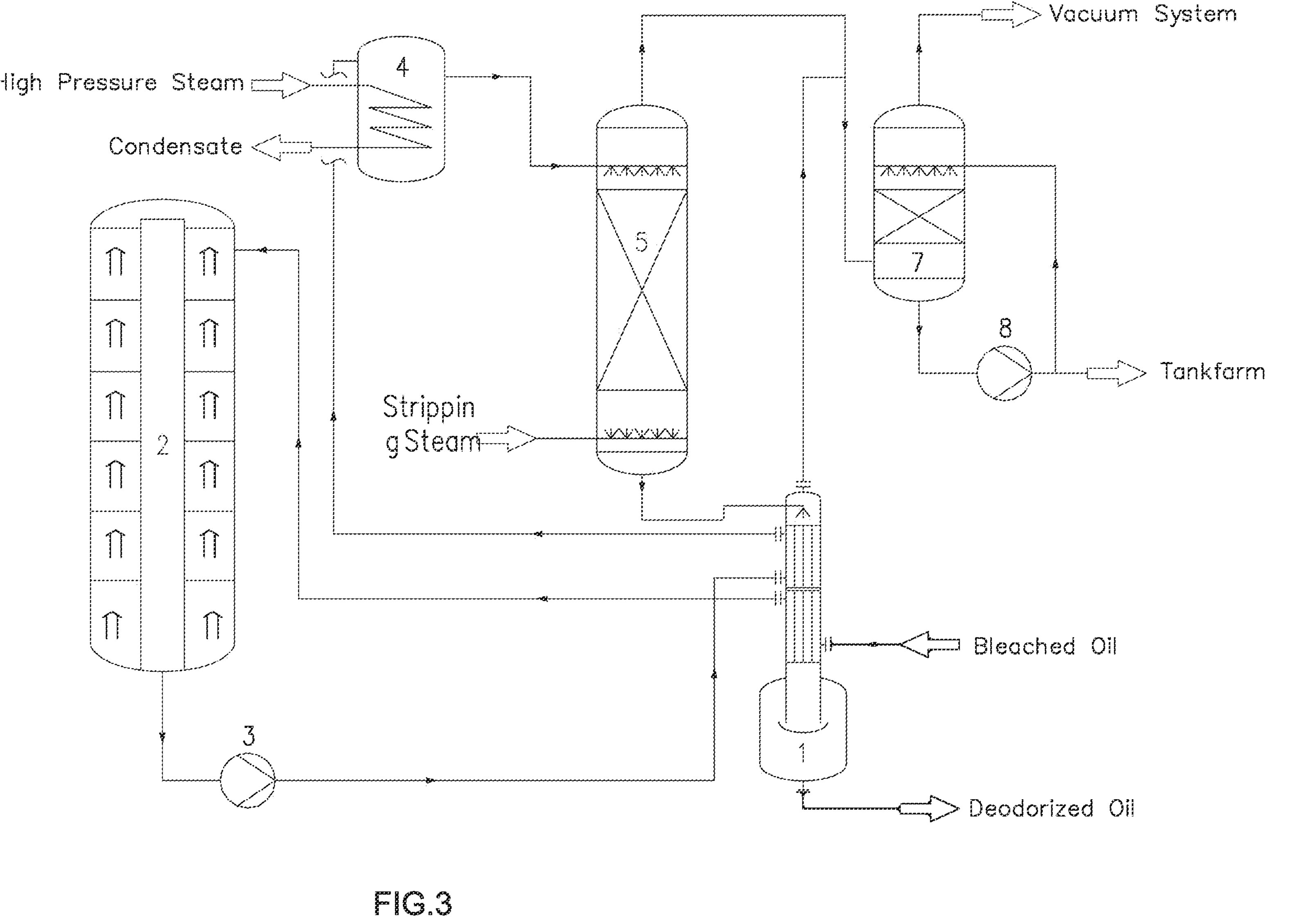
FIG. 3 is a schematic diagram of the new vegetable oil deodorization process with VE enrichment system (without vacuum pump design).

The specific embodiment of a VE enrichment system provided by the disclosure is described in further detail in conjunction with FIG. 2 and FIG. 3 below, FIG. 2 depicts: 1, falling film heat exchanger; 2, deodorization tower, 3, deodorizer transfer pump; 4, high-pressure steam heater; 5, post-stripping deodorization tower, 6, vacuum ejector; 7, fatty acid collection unit; 8, circulating pump.

The invention provides a specific connection mode of a VE enrichment system is as follows:

The lower shell side of falling film heat exchanger 1 is connected to the top of deodorization tower 2 by pipeline, a temperature gauge is installed on the pipeline, the aforementioned falling film heat exchanger is equipped with a temperature control device, using which the temperature of the bleached oil entering the deodorization tower 2 can be adjusted. The bottom of the deodorization tower 2 is then connected to the deodorizer transfer pump 3 through a pipeline, and then connected to the upper shell side of the falling film heat exchanger 1 through a pipeline, forming a loop connection.

The outlet of upper shell side of falling film heat exchanger 1 is successively connected with high-pressure steam heater 4 and further to the post-stripping deodorization tower 5 through pipelines, and the bottom of described post-stripping deodorization tower 5 is connected to the falling film heat exchanger 1 through pipeline. At the upper end, a loop connection is formed. The bottom of post-stripping deodorization tower 5 adopts direct steam heating. For the design containing vacuum ejector, the post-stripping deodorization tower 5 is connected with the suction port of the vacuum ejector 6 above through a pipeline, exhaust port of the vacuum ejector 6 is then connected to the fatty acid collection unit 7 through the pipeline. For the design without the vacuum ejector, the post-stripping deodorization tower 5 is directly connected with the fatty acid collection unit 7 through pipeline.

The fatty acid collection unit 7 and circulating pump 8 forms a loop connection with pipeline connections.

The invention provides a process flow of a VE enrichment system is as follows:

After the bleached oil treated by the bleaching unit enters the lower shell side section of the falling film heat exchanger 1 and exchanges heat with the high-temperature deodorization oil to 230~240° C., it enters the deodorization tower 2 to remove some unpleasant gas substances. After that, the deodorizer transfer pump 3 conveys it to the upper shell section of the falling film heat exchanger 1, and heat exchange with the high-temperature deodorization oil again to 240~250° C.

The primary deodorized oil after carrying out the second heat exchange with the high-temperature deodorized oil is transported to the high-pressure steam heater 4 through pipeline, and after further heating it with high-pressure steam, it enters the post-stripping deodorization tower 5. Direct steam stripping is adopted at the bottom of the post-stripping deodorization tower 5, and the internal temperature of the post-stripping deodorization tower 5 reaches 260~265° C. In one preferred embodiment, when the vacuum degree of the VE enrichment system configuration is poor (reference value: vacuum absolute pressure greater than 1.5 mbarA), a vacuum ejector 6 needs to be installed (see FIG. 2). The vacuum ejector is designed such that the suction port of the vacuum ejector 6 is connected with a pipeline to the top of the post-stripping deodorization tower 5, and the vacuum ejectors 6 uses motive steam, so that the interior of the post-stripping deodorization tower 5 reaches a vacuum absolute pressure of 0.8~1.5 mbar. The exhaust port of vacuum ejector 6 is connected with fatty acid collection unit 7. When the VE enrichment system is equipped with a good vacuum (reference value: vacuum absolute pressure less than or equal to 1.5 mbarA), there is no need to install a vacuum ejector. Without vacuum ejector, it is designed as the post-stripping deodorization tower 5 top is directly connected with the fatty acid collection unit 7. The design without a vacuum ejector does not require a separate vacuum ejector because the top of the fatty acid collection unit 7 is connected to an external vacuum system of high vacuum design.

Under the above-mentioned vacuum and temperature conditions, the free fatty acids and unpleasant gaseous substances of deodorized oil in post-stripping deodorization tower 5 will be further removed. At the same time, fatty acid distillate, which is rich in VE components, is removed.

The removed fatty acid distillate (VE content 9%~14%) is captured in fatty acid collection unit 7, and the captured fatty acid distillate is collected as a by-product. When fatty acid collection unit 7 reaches high level, fatty acid distillate (VE content 9%~14%) will be discharged to outdoor fatty acid distillate storage tank by circulating pump 8. When fatty acid collection unit 7 reaches low level, stop discharge.

The high-temperature deodorized oil processed by the post-stripping deodorization tower 5 flows out from the bottom of the post-stripping deodorization tower 5 and enters the falling film heat exchanger 1 and is indirectly contact the bleached oil for heat exchange (the bleached oil goes to the falling film evaporator 1 shell side, and the high-temperature deodorized oil goes to the falling film evaporator 1 tube side). After the high-temperature deodorized oil is exchanged with the bleached oil, the temperature is reduced and stored as a refined oil. At the same time, the bleached oil at a higher temperature enters the deodorization tower (2) for subsequent deodorization treatment.

Through the above operation, a VE enrichment system provided by the disclosure can be realized, advantages of a VE enrichment system provided by the invention are as follows:

(1) The bleached oil and the high-temperature deodorized oil in the falling film heat exchanger 1 can be increased by 10~15° C. after the second heat exchange than the first heat exchange, thereby improving the deodorization efficiency. The design of the secondary heat exchange can also make full use of the heat energy, about 30-40% of the amount of high-pressure steam, so as to achieve the purpose of saving natural gas or fuel oil.

(2), The deodorized oil that has been deodorized once enters the high-pressure steam heater 4 for further heating, and the internal temperature of the post-stripping deodorization tower 5 is guaranteed to be higher, and the vacuum degree is better. As a result, while obtaining a higher yield of fatty acid distillate, the content of VE in fatty acid distillate is significantly increased, creating higher economic benefits.

(3) The upper and lower segmented shell side of the falling film heat exchanger is equipped with a temperature control device, which can control the heat exchange temperature of the falling film heat exchanger in sections, which reduces the temperature of the bleached oil in the deodorization tower after heat exchange by the falling film heat exchanger, and controls the increase of trans fatty acids. As a result, higher quality refined oil products are obtained.

The invention claimed is:

1. A VE enrichment system, comprising:

a falling film heat exchanger (1); and a connected deodorization tower (2), wherein:

the falling film heat exchanger (1) is connected with a high-pressure steam heater (4), wherein the high-pressure steam heater (4) is connected to a post-stripping deodorization tower (5);

a bottom of the post-stripping deodorization tower (5) is connected with the falling film heat exchanger (1);

a top of the post-stripping deodorization tower (5) is connected with a fatty acid collection unit (7), wherein a bottom shell side outlet of the falling film heat exchanger (1) is connected with the deodorization tower (2) through a pipeline, wherein a bottom of the deodorization tower (2) is connected to a deodorizer transfer pump (3) through a pipeline, further wherein the deodorizer transfer pump (3) is then connected to an upper shell side of the falling film heat exchanger (1) through a pipeline, thereby forming a loop connection, such that oil exiting the deodorization tower (2) is directly recirculated to the falling film heat exchanger (1) prior to being conveyed to the high-pressure steam heater (4), thereby forming the loop connection between the falling film heat exchanger (1) and the deodorization tower (2).

2. The VE enrichment system of claim 1, wherein a post-stripping deodorization tower (5) top is connected with a suction port of an ejector (6), and wherein the ejector (6) is connected with the fatty acid collection unit (7).

3. The VE enrichment system of claim 2, wherein an ejector (6) exhaust port is connected with the fatty acid collection unit (7).

4. The VE enrichment system of claim 1, wherein an upper shell side of the falling film heat exchanger (1) is connected with the high-pressure steam heater (4) by the pipeline, and forms a loop connection with the post-stripping deodorization tower (5).

5. The VE enrichment system of claim 1, wherein the fatty acid collection unit (7) is connected with a circulating pump (8), forming a loop connection with the circulating pump (8) through a pipeline.

6. The VE enrichment system of claim 1, wherein the falling film heat exchanger (1) is comprised of upper and lower segmented falling film heat exchanger shell, and equipped with a temperature control device.

7. The VE enrichment system of claim 1, wherein the falling film heat exchanger (1) is a vertical falling film heat exchanger.

8. The VE enrichment system of claim 1, wherein a top outlet of the fatty acid collection unit (7) is connected with an external vacuum system.

9. The VE enrichment system of claim 2, wherein the fatty acid collection unit (7) is connected with a circulating pump (8), forming loop connection with the circulating pump (8) through a pipeline.

* * * * *